United States Patent
Watanabe

(10) Patent No.: US 9,252,840 B2
(45) Date of Patent: Feb. 2, 2016

(54) OPTICAL SIGNAL PROCESSING APPARATUS, TRANSMISSION APPARATUS, AND OPTICAL SIGNAL PROCESSING METHOD

(71) Applicant: FUJITSU LIMITED, Kawasaki-shi, Kanagawa (JP)

(72) Inventor: Shigeki Watanabe, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 86 days.

(21) Appl. No.: 14/103,211

(22) Filed: Dec. 11, 2013

(65) Prior Publication Data
US 2014/0233957 A1    Aug. 21, 2014

(30) Foreign Application Priority Data

Feb. 15, 2013 (JP) .................. 2013-028400

(51) Int. Cl.
*H04B 3/32* (2006.01)
*H04J 14/02* (2006.01)
*H04B 10/50* (2013.01)

(52) U.S. Cl.
CPC ............. *H04B 3/32* (2013.01); *H04B 10/506* (2013.01); *H04B 10/5057* (2013.01); *H04J 14/02* (2013.01)

(58) Field of Classification Search
USPC ........................................................ 398/91
See application file for complete search history.

(56) References Cited

U.S. PATENT DOCUMENTS 5,663,822 A * 9/1997 Fee .................. H04J 14/02
                                              359/333
6,008,931 A   12/1999 Von Helmolt et al.
(Continued)

FOREIGN PATENT DOCUMENTS

EP      2 040 117 A1    3/2009
JP      2010-171788     8/2010
(Continued)

OTHER PUBLICATIONS

Extended European Search Report issued May 28, 2014 in corresponding European Patent Application No. 13197985.8.

*Primary Examiner* — David Payne
*Assistant Examiner* — Omar S Ismail
(74) *Attorney, Agent, or Firm* — Staas & Halsey LLP

(57) ABSTRACT

An optical signal processing apparatus includes: an optical frequency comb generation unit configured to generate an optical frequency comb; an extraction unit configured to extract a plurality of optical components having a certain frequency interval between the optical components from the optical frequency comb; and an optical carrier generation unit configured to multiplex the plurality of optical components with reference light to thereby generate an optical carrier having a center frequency away from the center frequency of the reference light by an integer multiple of the frequency interval.

14 Claims, 15 Drawing Sheets

(56) References Cited

U.S. PATENT DOCUMENTS

| | | | | |
|---|---|---|---|---|
| 6,498,871 | B1* | 12/2002 | Kuboki | H04B 10/506 385/24 |
| 8,494,378 | B2* | 7/2013 | Takasaka | G02F 2/002 398/154 |
| 2007/0024857 | A1* | 2/2007 | Menezo | G01D 5/266 356/478 |
| 2008/0075463 | A1* | 3/2008 | Nakamoto | H04J 14/02 398/79 |
| 2008/0285606 | A1 | 11/2008 | Kippenberg et al. | |
| 2011/0229138 | A1 | 9/2011 | Watanabe | |
| 2012/0189308 | A1* | 7/2012 | Watanabe | H04B 10/07 398/79 |
| 2012/0301148 | A1 | 11/2012 | Watanabe | |
| 2013/0004163 | A1* | 1/2013 | Aoki | H04B 10/506 398/34 |
| 2013/0051803 | A1* | 2/2013 | Kato | H04J 14/02 398/79 |

FOREIGN PATENT DOCUMENTS

| | | |
|---|---|---|
| JP | 2011-215603 | 10/2011 |
| JP | 2012-249014 | 12/2012 |
| WO | 02/099939 A2 | 12/2002 |
| WO | WO 2011/052075 | 5/2011 |

* cited by examiner

OPTICAL SIGNAL PROCESSING APPARATUS, TRANSMISSION APPARATUS, AND OPTICAL SIGNAL PROCESSING METHOD

CROSS-REFERENCE TO RELATED APPLICATION

This application is based upon and claims the benefit of priority of the prior Japanese Patent Application No. 2013-028400, filed on Feb. 15, 2013, the entire contents of which are incorporated herein by reference.

FIELD

The embodiments discussed herein are related to an optical signal processing apparatus, a transmission apparatus, and an optical signal processing method.

BACKGROUND

With increasing demand for telecommunications, there is a demand for an efficient optical multiplexing transmission technology for efficiently transmitting a large volume of data through an optical communications system in an optical network. Optical multiplexing transmission is a technology to superimpose data signals by modulation onto multiple optical carriers (multi-carrier) of different wavelengths output from multiple light sources and multiplexing and transmitting optical signals resulting from the modulation, for example.

Optical multiplexing transmission schemes include dense wavelength division multiplexing (DWDM), Nyquist WDM, and orthogonal frequency division multiplexing (OFDM), for example.

In the DWDM scheme, a transmission rate of 10 to 100 Gbps is achieved by arranging the center frequencies of subcarriers' spectra at certain intervals (50 GHz, for example) in a frequency grid. Between the spectra, a protective area called guard band having a certain width (20 GHz, for example) is inserted in order to avoid crosstalk. The DWDM is thus limited in reduction of the channel spacing, but efficiency may be increased such as by improving transmission rate of channels and/or adoption of multilevel-modulated signals, for example.

Unlike the DWDM scheme, Nyquist WDM may form an ideal spectrum with sidelobe components removed through adoption of a Nyquist filter with small roll-off. The Nyquist WDM thus may achieve high efficiency because it may reduce the interval between the center frequencies of spectra down to the symbol rate frequency such that the spectra of neighboring channels adjoin without causing crosstalk.

The OFDM scheme achieves high efficiency by overlapping neighboring spectra so as to satisfy the orthogonality condition, thereby reducing the interval between the center frequencies of spectra down to the symbol rate frequency. Although OFDM involves a complicated synchronization process during modulation for satisfying the orthogonality condition between neighboring spectra, it advantageously enables flexible setting of signal band and modulation scheme.

In relation to optical multiplexing transmission techniques, Japanese Laid-open Patent Publication No. 2011-215603 and International Publication Pamphlet No. WO 2011/052075 describe optical frequency division multiplexing (FDM) techniques for modulating multiple optical signals of different frequencies based on different electrical signals and multiplexing and transmitting them on common carrier light.

For realizing highly efficient optical transmission using the optical multiplexing transmission techniques outlined above, stabilization of the center frequencies of subcarriers is further desired so that no crosstalk occurs between neighboring channels. For example, when a typical semiconductor laser (laser diode or LD) is employed as a subcarrier light source, a temperature adjusting unit having a precision to $\frac{1}{100}$ degrees or less and an automatic frequency controller (AFC) unit are used for center frequency stabilization.

Even with such measures, however, fluctuations in center frequency of, for example, about ±1 to 2 GHz occur. In DWDM, such fluctuations are likely to have little effect because a guard band of 20 GHz or more is secured when assuming that each signal has a bandwidth of 10 Gbps and the center frequency interval is 50 GHz.

However, influence of fluctuations is not negligible in the case of optical multiplexing transmission with its spectral efficiency close to 1. This may be the case when 25 GBd-quaternary phase shift keying (QPSK) signals are turned into 100-Gbps signals through polarization-division multiplexing and wavelength-division multiplexed at intervals of 50 GHz, for example.

Influence of crosstalk is noticeable especially when signals that take a large number of levels, such as 16-quadrature amplitude modulation (16-QAM) signals, are wavelength-multiplexed using the Nyquist WDM or OFDM scheme. For avoiding crosstalk effects, center frequency fluctuations are desirably stabilized at about $\frac{1}{100}$ to $\frac{1}{10}$ for example, though there is no advanced stabilizing technique that is able to achieve it.

Light sources with high frequency stability are available, such as stabilizing light sources for use as frequency standard or in measurement that have a narrow spectral width and use a mechanism to synchronize with a stable frequency such as a cesium atomic clock, for example. As such light sources are expensive and a large number of them are used in the case of optical communication, use of generic light sources is desirable for cost saving.

SUMMARY

According to an aspect of the embodiments, an optical signal processing apparatus includes: an optical frequency comb generation unit configured to generate an optical frequency comb; an extraction unit configured to extract a plurality of optical components having a certain frequency interval between the optical components from the optical frequency comb; and an optical carrier generation unit configured to multiplex the plurality of optical components with reference light to thereby generate an optical carrier having a center frequency away from the center frequency of the reference light by an integer multiple of the frequency interval of the above plurality of optical components.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
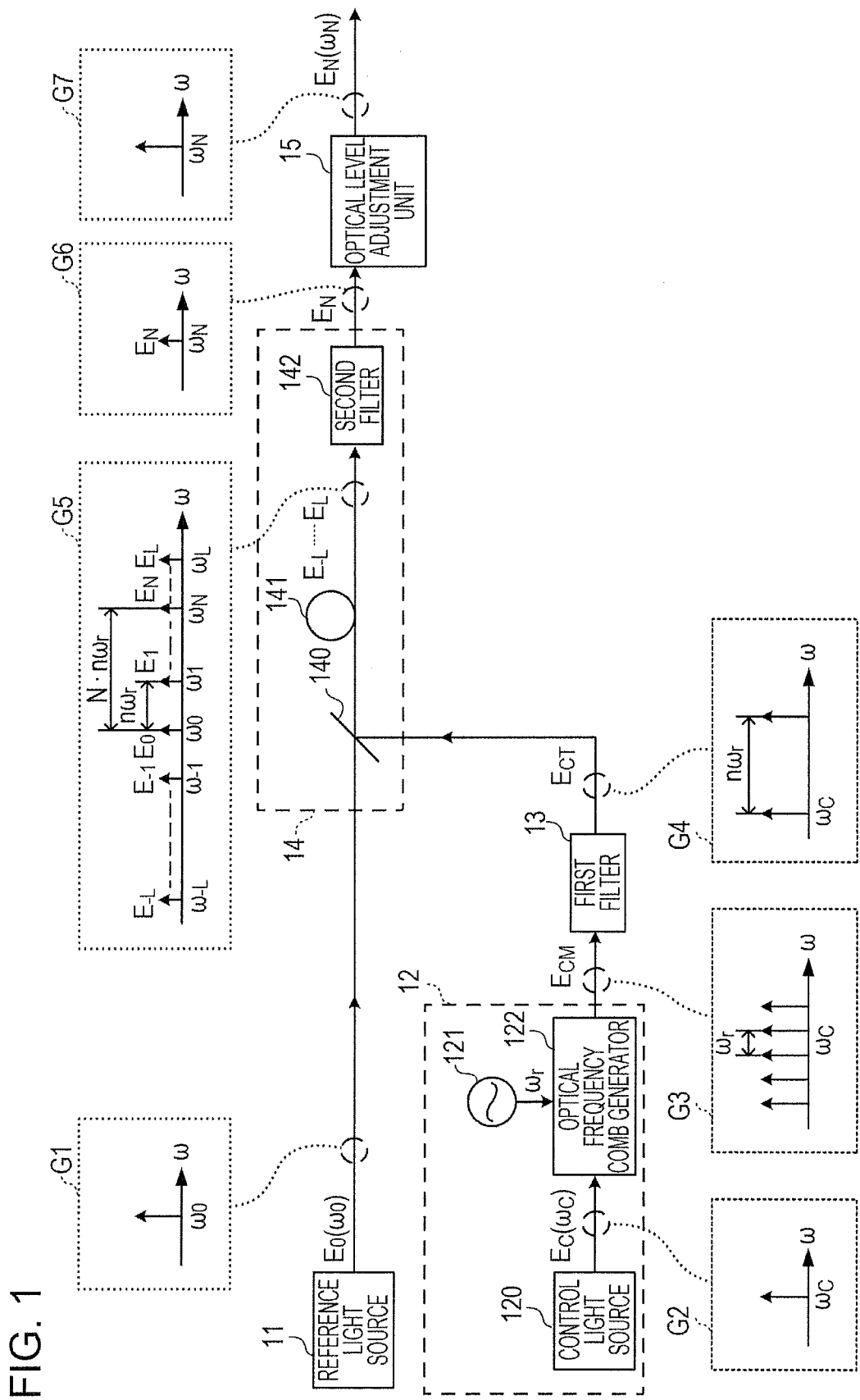
FIG. 1 is a diagram illustrating a functional configuration of an optical signal processing apparatus according to a first embodiment of the present disclosure.

FIG. 1 is a diagram illustrating the functional configuration of an optical signal processing apparatus according to a first embodiment of the present disclosure. The optical signal processing apparatus generates carrier light (optical carriers) on which data signals are multiplexed and transmitted.

The optical signal processing apparatus includes a reference light source 11, an optical frequency comb generation (OFCG) unit 12, a first filter (extraction unit) 13, an optical carrier generation (OCG) unit 14, and an optical level adjustment (OLA) unit 15. The components 11 to 15 are interconnected by optical fiber or the like.

The reference light source 11 generates reference light $E_0$ having a center frequency $\omega_0$ (see graph G1) and outputs it to the optical carrier generation unit 14. The center frequency $\omega_0$ is a highly accurate frequency stabilized to a frequency standard. For the sake of convenience, frequency is denoted herein as angular frequency $\omega$ ($=2\pi\times$frequency).

The optical frequency comb generation unit 12 generates optical frequency comb $E_{CM}$ and outputs it to the first filter 13. The optical frequency comb $E_{CM}$ is a series of light spectra having a certain frequency interval between them. The structure of the spectra is called "optical frequency comb" as it is shaped like a comb as illustrated in graph G3.

The optical frequency comb generation unit 12 includes a control light source 120, an oscillator 121, and an optical frequency comb generator 122. The control light source 120 generates continuous wave (CW) $E_C$ with center frequency $\omega_C$, for example, and outputs it to the optical frequency comb generator 122 (see graph G2).

The oscillator 121, which may be a crystal oscillator, a cesium atomic clock, or a high-precision synthesizer for example, outputs a drive signal (a radio frequency or RF signal) of a stable frequency $\omega_r$ to the optical frequency comb generator 122. The optical frequency comb generator 122 is a Mach-Zehnder modulator for example, and generates an optical frequency comb $E_{CM}$ by modulating the continuous wave $E_C$ responsive to the drive signal of the reference frequency $\omega_r$ input from the oscillator 121 (see graph G3).

When implemented as a Mach-Zehnder modulator, the optical frequency comb generator 122 yields optical frequency comb $E_{CM}$ by multiplexing output lights from two internal optical phase modulators. The optical frequency comb generator 122 generates, as optical frequency comb $E_{CM}$, harmonic components that occur in phase modulation of the input continuous wave $E_C$ by appropriately controlling driving conditions.

The optical frequency comb $E_{CM}$ has multiple optical components having a certain frequency interval $\omega_r$ between them. By way of example, assuming that frequencies $\omega_C$ and $\omega_r$ are 25 GHz, the optical frequency comb $E_{CM}$ has optical components 25 GHz, 50 GHz, 75 GHz, 100 GHz, . . . . Here, the frequency interval $\omega_r$ is controlled at 25 GHz with precision because the reference frequency $\omega_r$ of the drive signal is stabilized.

The accuracy of frequency interval $\omega_r$ of the optical frequency comb $E_{CM}$ is dependent on the accuracy of the reference frequency $\omega_r$ of the oscillator 121. The oscillator 121 thus desirably has a frequency accuracy of about $10^{-10}$ ppm, for example.

The optical frequency comb generator 122 is not limited to a Mach-Zehnder modulator; it may be a $LiNbO_3$ optical modulator, for example. In this case, adoption of a hybrid configuration combining a phase modulator with an intensity modulator enables formation of an optical frequency comb $E_{CM}$ having a flat intensity and a broadband spectrum.

When an optical modulator is used as the optical frequency comb generator 122 as mentioned, a high-quality and stable optical frequency comb $E_{CM}$ may be yielded with a compact and simple configuration and also the frequency interval $\omega_r$ may be easily controlled through adjustment of the reference frequency $\omega_r$ of the oscillator 121. In this case, adoption of a voltage-controlled crystal (Xtal) oscillator (VCXO) for the oscillator 121 would enable voltage-based control of frequency interval $\omega_r$.

The way of generating optical frequency comb $E_{CM}$ is not limited to the above-described configuration. For example, an integrated optical frequency comb generator such as an on-silicon ultra-high-Q toroidal silica resonator or an InP-based generator may be used.

Figure 2:
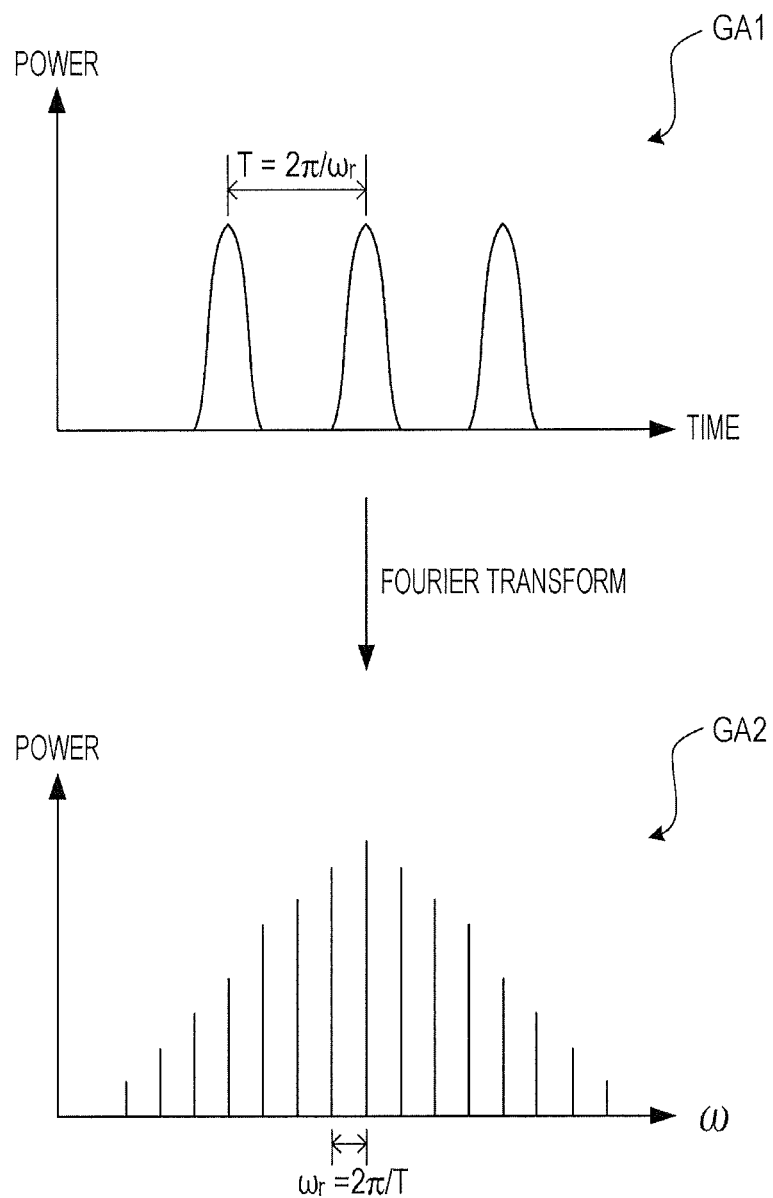
FIG. 2 illustrates a method of generating an optical frequency comb with pulsed laser.

FIG. 2 illustrates a method of generating optical frequency comb $E_{CM}$ with pulsed laser. The pulsed laser may be mode-locked laser (MLL) or laser generated by intensity modulation of a continuous wave, for example.

As illustrated in graph GA1, a pulsed laser outputs pulsed light having period T ($=2\pi/\omega_r$) (sec). In the spectrum of the pulsed light, a train of optical frequency modes with frequency interval $\omega_r$ ($=2\pi/T$), namely optical frequency comb $E_{CM}$, is observed as illustrated in graph GA2.

The optical frequency comb $E_{CM}$ has a wider spectrum as the pulsed laser is of a narrower pulse width. As a mode-locked laser in particular is able to generate a short pulse having a high peak power, it enables formation of an optical frequency comb $E_{CM}$ of a broadband spectrum. When the pulse width is in units of femtosecond (fs), for example, the bandwidth of the generated optical frequency comb $E_{CM}$ is in several hundreds of terahertz (THz) and its frequency interval $\omega_r$ becomes a highly precise value. In this case, the optical frequency comb $E_{CM}$ is of quality that may be used for the optical frequency standard.

Figure 3:
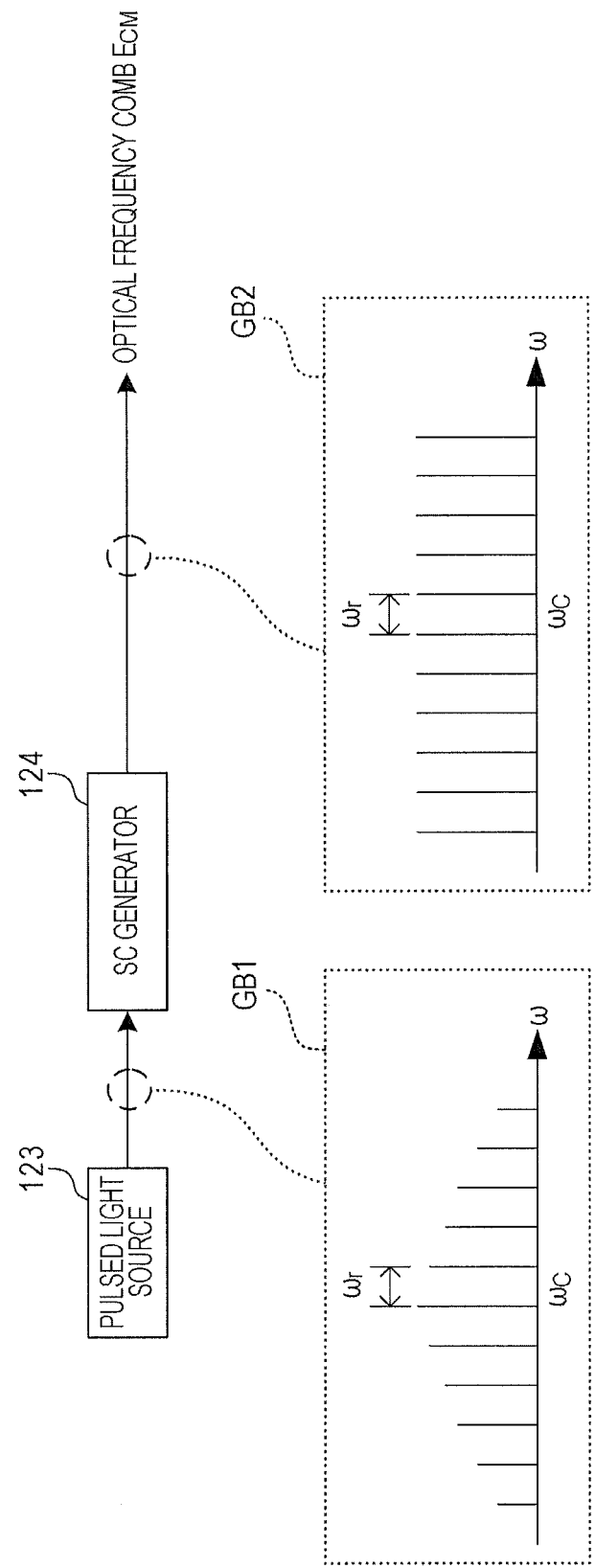
FIG. 3 is a diagram illustrating a configuration for generating an optical frequency comb by generating supercontinuum light.

FIG. 3 is a diagram illustrating a configuration for generating optical frequency comb $E_{CM}$ by generating supercontinuum light. In this case, the optical frequency comb generation unit 12 includes a pulsed light source 123 and a super continuum (SC) generator 124.

As illustrated in graph GB1, a pulsed laser output from the pulsed light source 123 oscillates with center frequency $\omega_C$ and its spectrum has frequency interval $\omega_r$. By the pulsed laser being input to the SC generator 124, supercontinuum light is generated and optical frequency comb $E_{CM}$ is produced as illustrated in graph GB2.

The SC generator 124 may be an optical fiber, for example. The optical fiber may be a single-mode fiber, a highly-non-linear fiber (HNLF), a photonic crystal fiber, and the like. In other words, the optical frequency comb $E_{CM}$ is produced by applying self-phase modulation (SPM) to a pulsed laser to expand its spectrum. The optical frequency comb $E_{CM}$ may also be generated using four-wave mixing that occurs in fibers.

As described, the optical frequency comb $E_{CM}$ may be generated in various ways. The optical frequency comb $E_{CM}$ generated by the optical frequency comb generation unit 12 is input to the first filter 13.

The first filter 13 is an optical frequency filter that extracts multiple optical components having a certain frequency interval $n\omega_r$ (n=1, 2, 3, . . . ) between them from the optical frequency comb $E_{CM}$ (see graph G4). Thereby, a beat light having a difference frequency n times the frequency interval $\omega_r$ of the optical frequency comb $E_{CM}$ is generated. Here, n is determined based on the center frequency of the desired optical carrier. Because the frequency interval $\omega_r$ of the optical frequency comb $E_{CM}$ is an accurately controlled value as mentioned above, the frequency interval $n\omega_r$ is also a precise value.

The absolute frequency and number of optical components to be extracted are not limited as long as the frequency interval between the optical components is fixed ($n\omega_r$). Although two optical components, namely the optical component at frequency $\omega_C$ and the optical component at center frequency $\omega_C + n\omega_r$ are extracted in the example in graph G4, the optical component at center frequency $\omega_C + n\omega_r + n\omega_r$ may be additionally extracted.

The first filter 13 is desirably a tunable filter that passes light of specified frequencies so that multiple optical components to extract may be freely selected. It is possible to use other way of extraction instead of the first filter 13. The optical components extracted by the first filter 13 are output to the optical carrier generation unit 14 as control light $E_{CT}$ for modulating reference light $E_0$.

The optical carrier generation unit 14 includes a multiplexing unit 140, a non-linear optical medium 141, and a second filter 142. The multiplexing unit 140, which may be an optical coupler for example, multiplexes the reference light $E_0$ and control light (beat light) $E_{CT}$ input to it. The reference light $E_0$ and control light $E_{CT}$ after the multiplexing are input to the non-linear optical medium 141.

The reference light $E_0$ is modulated by the non-linear optical effect of the non-linear optical medium 141, generating multiple modulated components $E_{-L}, \ldots, E_L$ (where L is a natural number) (see graph G5). The modulated components $E_{-L}, \ldots, E_L$ have frequency interval $n\omega_r$ the same as the frequency interval $n\omega_r$ of the control light $E_{CT}$.

By use of the non-linear optical medium 141, multiple modulated components $E_{-L}, \ldots, E_L$ are easily generated from the reference light $E_0$. The non-linear optical medium 141 may be optical fiber, for example. The optical fiber may include a single-mode fiber, a dispersion-shifted fiber, a highly non-linear fiber, a photonic crystal fiber, and a chalcogenide fiber. In addition, a fiber or a waveguide structure with germanium or bismuth added to the core for increasing index of refraction, or a fiber or a waveguide structure having a decreased mode field for increasing light power intensity may also be used as the non-linear optical medium 141.

The non-linear optical medium 141 is not limited to optical fibers and other devices may be used. For instance, a semiconductor optical amplifier having a quantum well structure, a quantum dot semiconductor optical amplifier, and a silicon photonics waveguide may be used as the non-linear optical medium 141.

Non-linear optical effects provided by the non-linear optical medium 141 include cross phase modulation (XPM), for example. XPM is a phenomenon of phase change of one of two lightwaves having different wavelengths that occurs in proportion to the light intensity of the other lightwave during propagation in a non-linear optical medium.

The multiple modulated components $E_{-L}, \ldots, E_L$ are generated by modulating the reference light $E_0$ with the control light $E_{CT}$. As the control light $E_{CT}$ has difference frequency $n\omega_r$ of the control light $E_{CT}$ which is beat light extracted from the optical frequency comb $E_{CM}$ as mentioned above, the frequency interval between the modulated components $E_{-L}, \ldots, E_L$ is $n\omega_r$. The modulated components $E_{-L}, \ldots, E_L$ therefore each have a center frequency $\omega_N$ that is away from the center frequency $\omega_0$ of the reference light $E_0$ by an integer multiple of frequency interval $n\omega_r$. That is, when N is an integer, the center frequency $\omega_N$ of modulated component $E_N$ is represented by expression (1):

$$\omega_N = \omega_0 + N \cdot n\omega_r \quad (1)$$

Specifically, the intensity of the N-th order modulated component $E_N$ with center frequency $\omega_N$ is represented by an N-th order Bessel function of the first kind $J_N(\beta)$. Here, variable $\beta$ indicates the degree of modulation of XPM relating to the amplitude of control light $E_{CT}$, which is the beat light.

The multiple modulated components $E_{-L}, \ldots, E_L$ therefore have frequency interval $n\omega_r$ corresponding to the period of intensity change of control light $E_{CT}$. Because the frequency interval $n\omega_r$ is a precise value, $N \cdot n\omega_r$, which is an integer multiple of it, is a precise value as well. Also, the center frequency $\omega_0$ of the reference light $E_0$ is stabilized as the frequency standard.

Hence, the frequencies $\omega_{-L}, \ldots, \omega_L$ of the modulated components $E_{-L}, \ldots, E_L$ are precisely tuned at integer multiples of frequency $\omega_r$ and have accuracy close to the reference frequency $\omega_r$. Phase noises of the optical components of the frequency comb $E_{CM}$ are cancelled out in the optical carrier generation unit 14 because they are aligned with each other. Consequently, the phase noise of the modulated components $E_{-L}, \ldots, E_L$ is reduced and each spectrum has a narrow line width.

The modulated components $E_{-L}, \ldots, E_L$ are input to the second filter 142. The second filter 142 is an optical frequency filter, for example, for extracting a predetermined modulated component $E_N$ as desired optical carrier from the modulated components $E_{-L}, \ldots, E_L$ (see graph G6). The center frequency $\omega_N$ of the extracted modulated component $E_N$ is away from the center frequency $\omega_0$ of the reference light $E_0$ by an integer (N) multiple of the frequency interval $n\omega_r$.

The integer N is determined based on the frequency $\omega_N$ of the desired optical carrier. The second filter 142 is thus desirably a tunable filter that passes light of specified frequencies so that modulated component $E_N$ to extract may be freely selected. It is possible to use other ways of extraction instead of the second filter 142.

As described, the optical carrier generation unit 14 generates optical carrier $E_N$ having center frequency $\omega_N$ which is away from the center frequency $\omega_0$ of reference light $E_0$ by an integer (N) multiple of the frequency interval by multiplexing multiple optical components $E_{CT}$ with reference light $E_0$. Since a frequency conversion band obtained by XPM is tens of terahertz, for example, an optical carrier having a highly precise frequency may be easily produced even when the band of the optical frequency comb $E_{CM}$ is narrow (tens of gigahertz, for example).

Although this embodiment uses XPM for modulation of reference light $E_0$, this is not limitative but other non-linear optical effects such as four-wave mixing may be employed. In this case, a device that produces second-order nonlinear optical effects, such as three-wave mixing, may be used for the non-linear optical medium 141. Such a device includes a $LiNbO_3$ waveguide having a quasi phase matching structure (periodically poled $LiNbO_3$ or PPLN), GaAlAs element, and second-order nonlinear optical crystals, for example. When a second-order nonlinear optical crystal is used, it is desirable to select one having a structure that permits phase matching in relation to wavelength arrangement.

The optical carrier $E_N$ produced by the optical carrier generation unit 14 is output to the optical level adjustment unit 15. The optical level adjustment unit 15, which is an optical amplifier for example, adjusts the level (power) of optical carrier $E_N$ generated by the optical carrier generation unit 14 (see graph G7).

Figure 4:
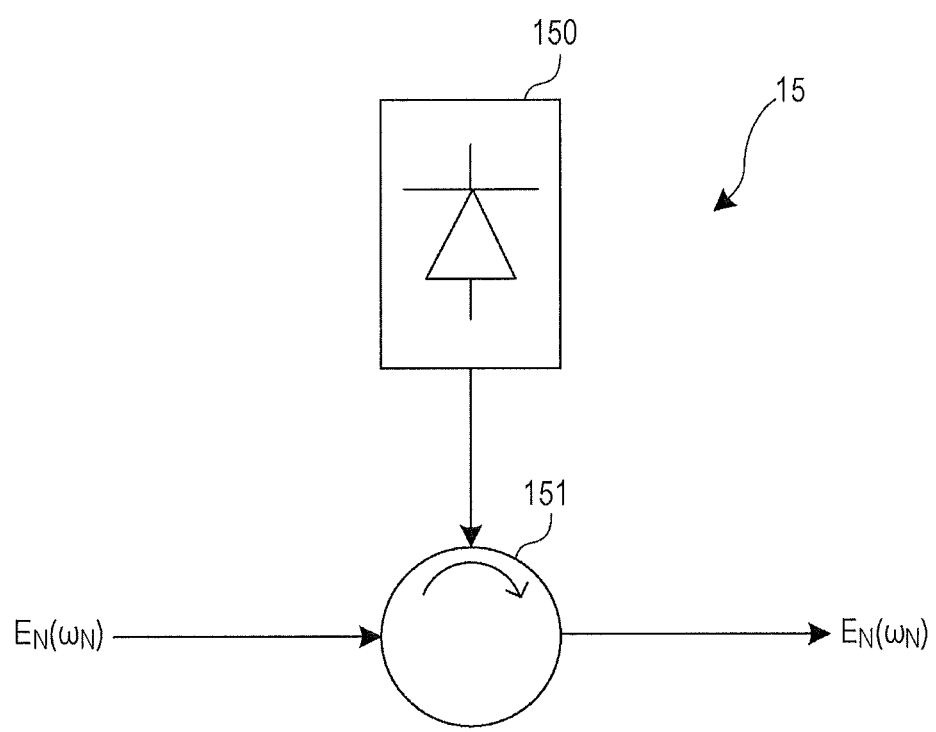
FIG. 4 is a diagram illustrating an example of the configuration of an optical level adjustment unit.

Instead of adjusting the level of the optical carrier $E_N$ alone, both the level and optical signal-to-noise ratio (OSNR) may be adjusted using laser injection locking if OSNR is insufficient. FIG. 4 is a diagram illustrating an example of the configuration of the optical level adjustment unit 15 for such a case.

The optical level adjustment unit 15 includes a semiconductor laser device 150 and a circulator 151. Laser output from the semiconductor laser device 150 is input to the circulator 151 as a slave laser. The optical carrier $E_N$ from the optical carrier generation unit 14 is input to the circulator 151 as a master laser.

As a result, the optical carrier $E_N$ from the optical carrier generation unit 14 is injected to the laser from the semiconductor laser device 150 with their input directions matched with each other. Therefore, among the frequency components of the laser from the semiconductor laser device 150, a single frequency component (frequency $\omega_N$) common to the optical carrier $E_N$ is newly output as optical carrier $E_N$. If the optical carrier $E_N$ from the optical carrier generation unit 14 is of a sufficient level, the optical level adjustment unit 15 may not be provided.

As this embodiment generates optical carrier $E_N$ utilizing XPM, conditions relating to XPM are adjusted so that the efficiency of the optical carrier $E_N$ generation ($\propto J_N(\beta)$) is optimal. These conditions include the power and the polarization state of control light $E_{CT}$ extracted as the beat light, and/or the length, the non-linear coefficient, the chromatic dispersion, and the loss of an optical fiber used as the non-linear optical medium 141, for example.

Figure 5:
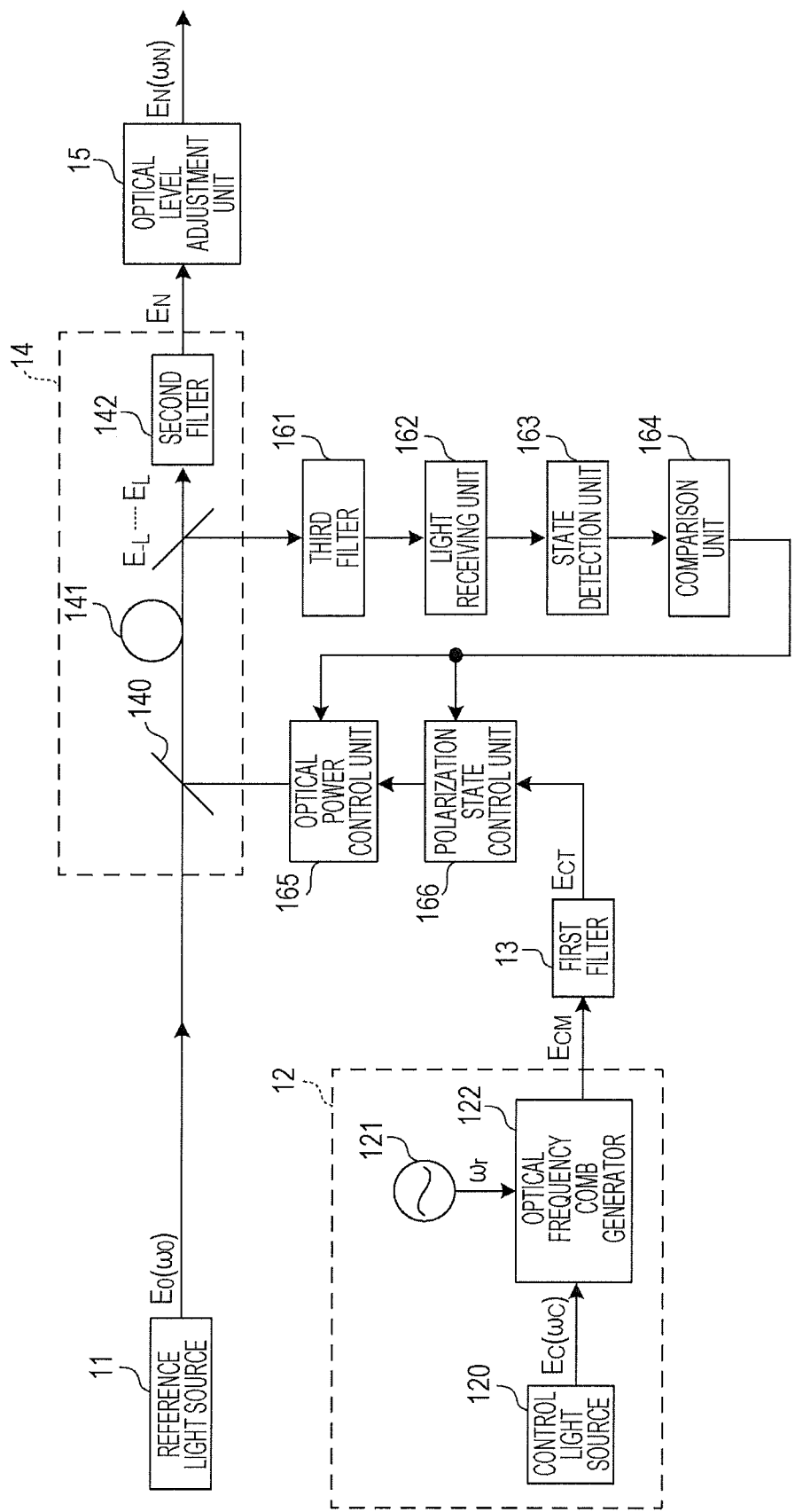
FIG. 5 is a diagram illustrating the functional configuration of an optical signal processing apparatus according to a second embodiment of the present disclosure.

FIG. 5 is a diagram illustrating the functional configuration of an optical signal processing apparatus according to a second embodiment of the present disclosure. In FIG. 5, elements common to FIG. 1 are denoted with the same reference characters and their descriptions are omitted.

The optical signal processing apparatus according to the second embodiment has a configuration for dynamically controlling the power and polarization state of control light $E_{CT}$ among the conditions listed above. More specifically, the optical signal processing apparatus includes a third filter 161, a light receiving unit 162, a state detection unit 163, a comparison unit 164, an optical power control unit (a state control unit) 165, and a polarization state control unit (a state control unit) 166 in addition to the configuration illustrated in FIG. 1.

The third filter 161 is an optical frequency filter, for example, that extracts a modulated component to be inspected from multiple modulated components $E_{-L}, \ldots, E_L$. The extracted modulated component is received by the light receiving unit 162, which includes light receiving elements such as photodiodes (PD), and converted into an electrical signal. The third filter 161 is desirably a tunable filter that passes light of a specified frequency so that a modulated component to inspect may be freely selected.

The state detection unit 163 detects the state of a modulated component generated by the optical carrier generation unit 14 based on the electrical signal input from the light receiving unit 162. The state detection unit 163 detects the power, waveform, and spectrum of the modulated component. The result of detection is input to the comparison unit 164.

The comparison unit 164 compares the result of detection input from the state detection unit 163 with predetermined reference values, which are prestored in storage such as memory for example. The comparison unit 164 outputs comparison results relating to power and polarization state to the optical power control unit 165 and the polarization state control unit 166 respectively.

The optical power control unit 165 and the polarization state control unit 166 respectively control the power and polarization state of control light $E_{CT}$ to be input to the optical carrier generation unit 14 based on the comparison results relating to the power and polarization state. That is, the optical power control unit 165 and polarization state control unit 166 control the state of control light $E_{CT}$ based on the state of modulated components detected by the state detection unit 163.

With this configuration, the multiple modulated components $E_{-L}, \ldots, E_L$ generated by the optical carrier generation unit 14 are feedback controlled, so the efficiency of generating the modulated components $E_{-L}, \ldots, E_L$ is controlled to be optimal. Although the state detection unit 163 performs state detection on a single modulated component out of multiple modulated components $E_{-L}, \ldots, E_L$ in the second embodiment, it may perform state detection on two or more modulated components.

Figure 6:
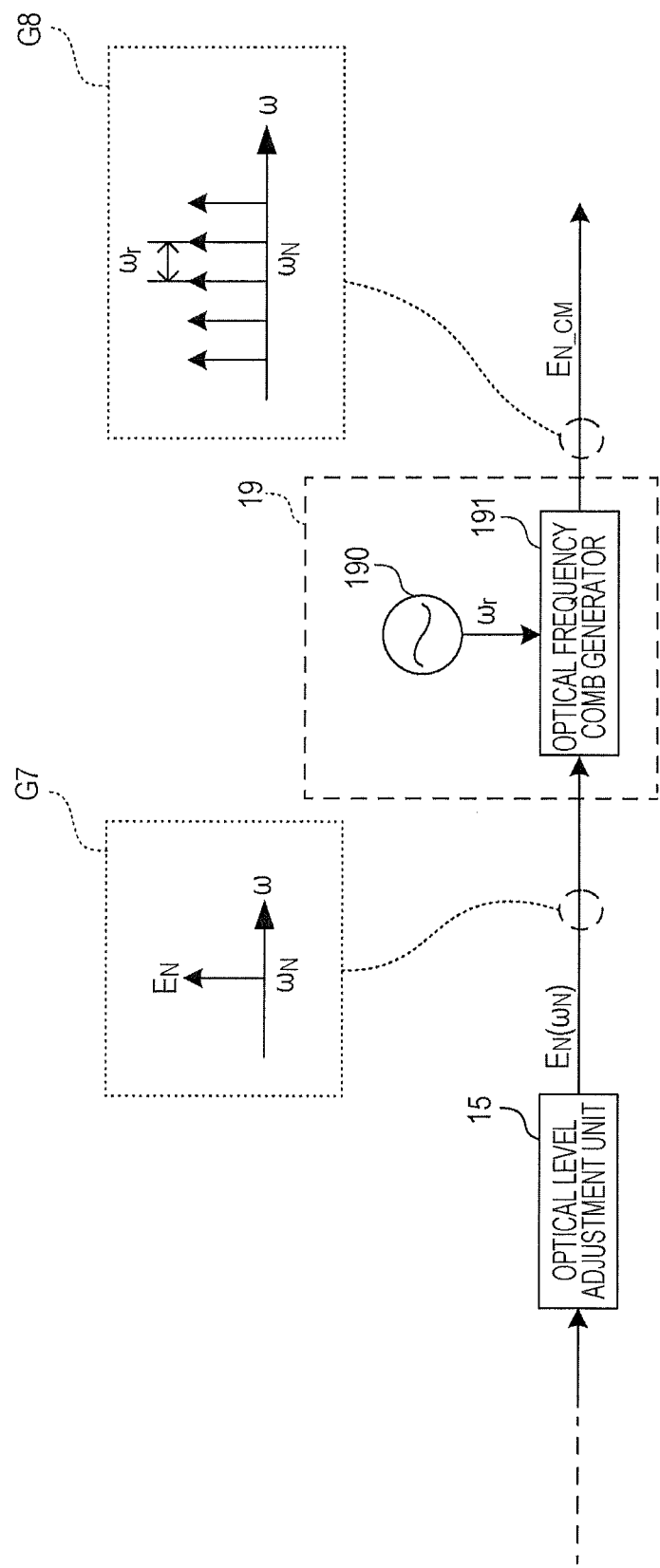
FIG. 6 is a diagram illustrating the functional configuration of an optical signal processing apparatus according to a third embodiment of the present disclosure.

Although a single optical carrier $E_N$ is generated in the optical signal processing apparatus thus far described, more than one optical carrier may be generated. FIG. 6 is a diagram illustrating the functional configuration of an optical signal processing apparatus according to a third embodiment of the present disclosure. In FIG. 6, descriptions about elements common to FIG. 1 are omitted except for the optical level adjustment unit 15.

The optical signal processing apparatus includes a carrier-increasing optical frequency comb generation unit 19 in addition to the configuration illustrated in FIG. 1 or 5. The carrier-increasing optical frequency comb generation unit 19 includes an oscillator 190 and an optical frequency comb generator 191, and generates optical frequency comb $E_{N\_CM}$ based on the optical carrier $E_N$ generated by the optical carrier generation unit 14.

The oscillator 190 may be a crystal oscillator, a cesium atomic clock, or a precision synthesizer, for example, for outputting a drive signal having reference frequency $\omega_r$ to the optical frequency comb generator 191. The optical frequency comb generator 191, which may be a Mach-Zehnder modulator for example, generates optical frequency comb $E_{N\_CM}$ by modulating generated optical carrier $E_N$ responsive to the drive signal (RF signal) of the reference frequency $\omega_r$ input from the oscillator 190 (see graph G8).

The optical frequency comb $E_{N\_CM}$ contains multiple optical components having a certain frequency interval $\omega_r$ between them in the sidebands of frequency $\omega_N$. Since the frequency interval $\omega_r$ is a precisely controlled value, the optical frequency comb $E_{N\_CM}$ is used as a carrier wave in optical multiplexing transmission using DWDM, Nyquist WDM, or OFDM.

Figure 7:
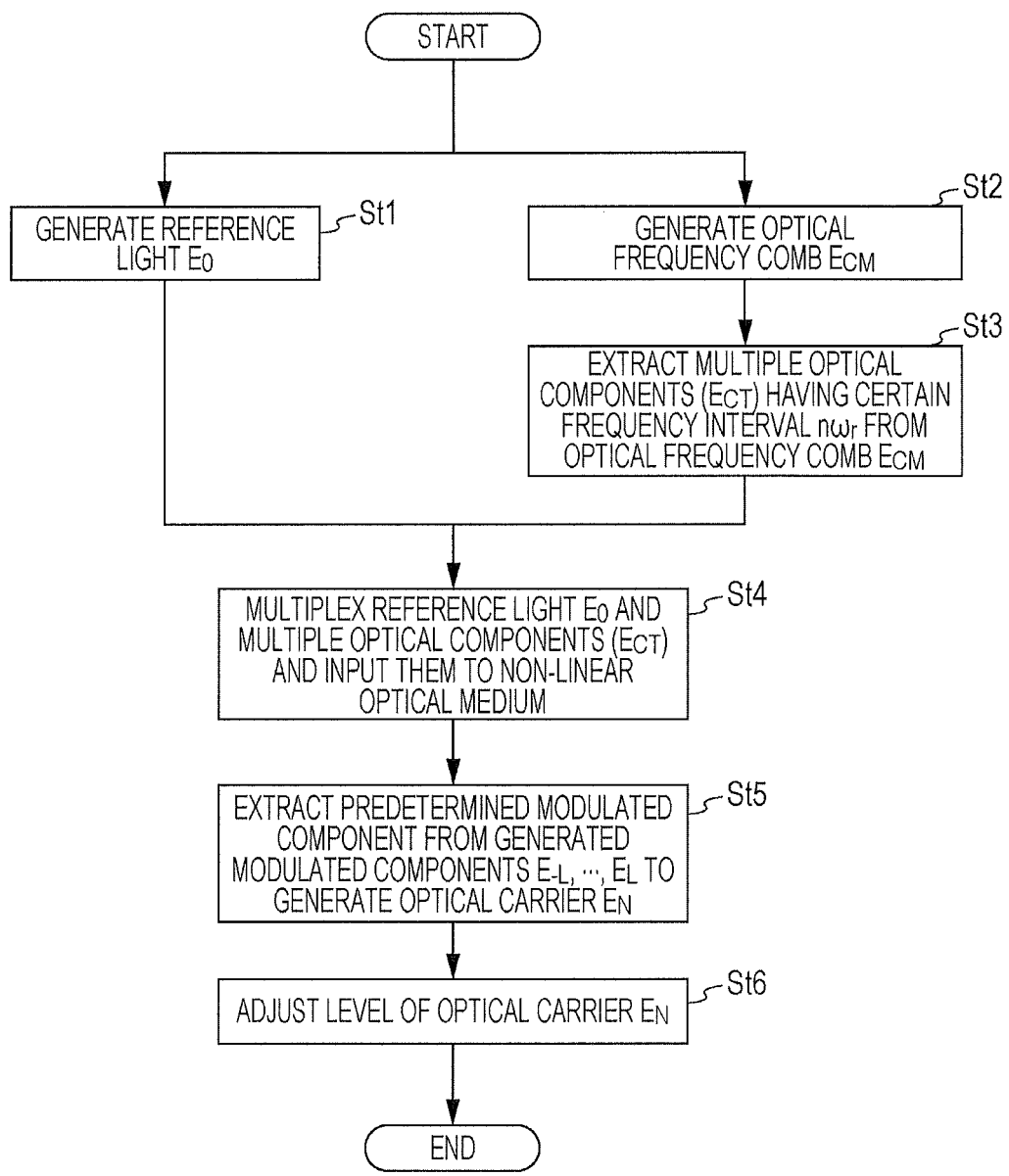
FIG. 7 is a flowchart illustrating an optical signal processing method according to an embodiment.

FIG. 7 is a flowchart illustrating an optical signal processing method according to an embodiment, where step St1 is executed in parallel with steps St2 and St3.

First, the reference light source 11 generates reference light $E_0$ and outputs it to the optical carrier generation unit 14 (step St1). Also, the optical frequency comb generation unit 12 generates optical frequency comb $E_{CM}$ and outputs it to the first filter 13 (step St2). The first filter 13 extracts multiple optical components (control light $E_{CT}$) having a certain frequency interval $n\omega_r$ between them from the optical frequency comb $E_{CM}$ (step St3). The extracted optical components (control light $E_{CT}$) are input to the optical carrier generation unit 14.

The optical carrier generation unit 14 then multiplexes the reference light $E_0$ and the multiple optical components $E_{CT}$ at the multiplexing unit 140 and inputs them to the non-linear optical medium 141 (step St4). The reference light $E_0$ is modulated with the optical components $E_{CT}$ using the non-linear optical effect yielded by the non-linear optical medium 141 such as XPM, resulting in multiple modulated components $E_{-L}, \ldots, E_L$ having frequency interval $n\omega_r$ between them.

Next, the optical carrier generation unit 14 generates optical carrier $E_N$ by extracting a predetermined modulated component $E_N$ from the modulated components $E_{-L}, \ldots, E_L$ through the second filter 142 (step St5). The optical carrier $E_N$ has center frequency $N \cdot n\omega_r$ that is away from the center frequency $\omega_0$ of the reference light $E_0$ by an integer (N) multiple of frequency interval $n\omega_r$.

Then, the optical level adjustment unit 15 adjusts the level of optical carrier $E_N$ (step St6). The optical signal processing method is carried out in this manner.

Figure 8:
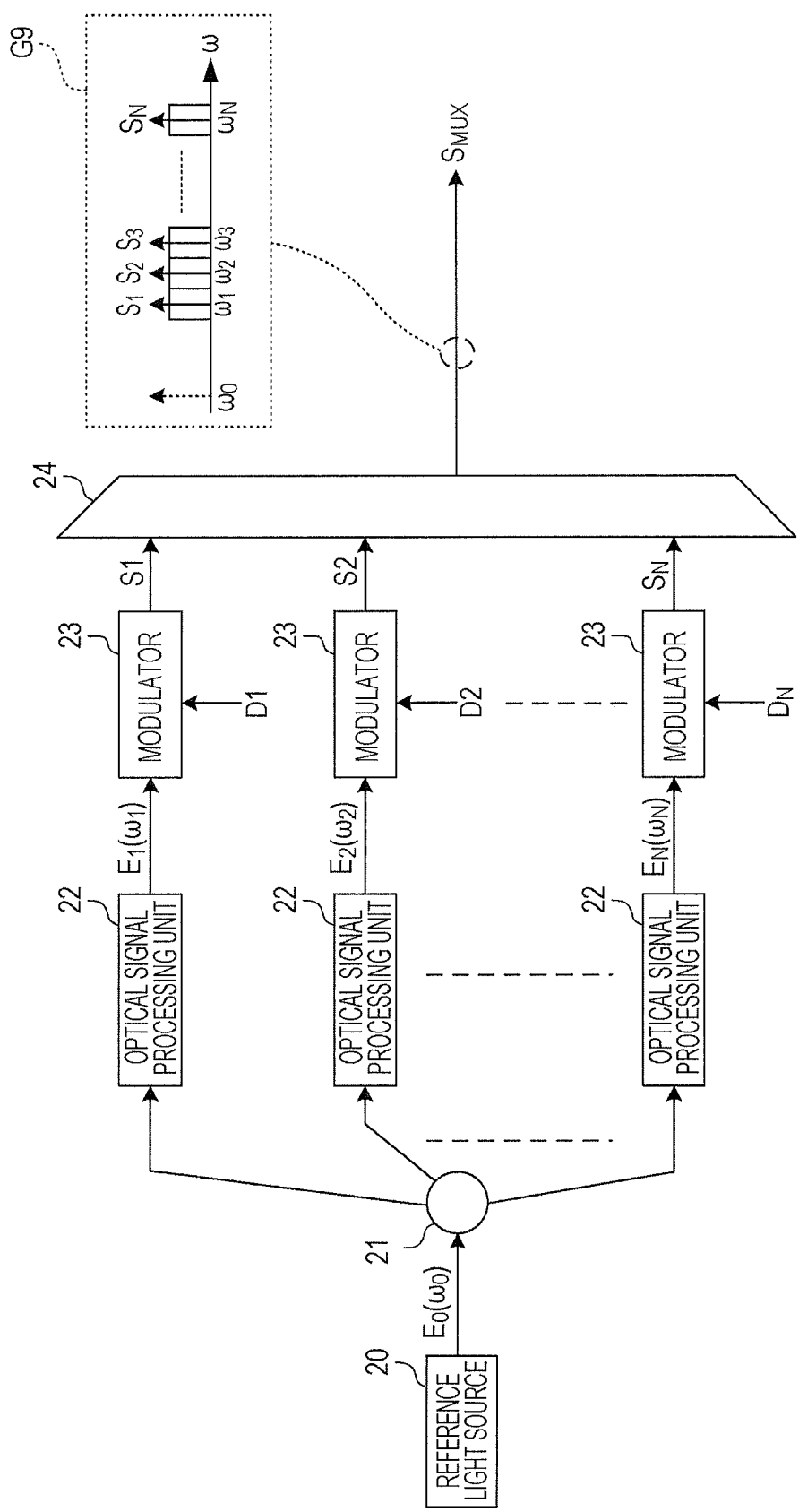
FIG. 8 is a diagram illustrating the configuration of a transmission apparatus according to an embodiment.

Next, a transmission apparatus that uses the optical signal processing apparatus described above will be discussed. FIG. 8 is a diagram illustrating the configuration of a transmission apparatus according to an embodiment. The transmission apparatus generates multiple optical signals from optical carrier generated by the optical signal processing apparatus described above, and multiplexes and transmits them.

The transmission apparatus includes a reference light source 20, a splitter 21, multiple optical signal processing units 22, multiple modulators 23, and a multiplexer 24. The reference light source 20 is the counterpart of the reference light source 11 of the aforementioned optical signal processing apparatus and outputs reference light $E_0$ to the multiple optical signal processing units 22 via the splitter 21. The splitter 21 is an optical splitter to split reference light $E_0$ in terms of power.

The optical signal processing units 22 each have the configuration of the optical signal processing apparatus described above excluding the reference light source 11. That is to say, the reference light source 20 and the optical signal processing units 22 correspond to the optical signal processing apparatus described above.

The optical signal processing units 22 respectively generate optical carriers $E_1$ to $E_N$. The optical signal processing units 22 thus have different frequencies $\omega_1$ to $\omega_N$ of modulated components extracted by the second filter 142.

The modulators 23 respectively modulate optical carriers $E_1$ to $E_N$ with data signals $D_1$ to $D_N$, generating optical signals $S_1$ to $S_N$ corresponding to channels 1 to N. The modulation scheme may be QAM, for example. The optical signals $S_1$ to $S_N$ thus generated are input to the multiplexer 24.

The multiplexer 24 is a multiplexing unit such as an optical coupler, a wavelength selective switch (WSS) or an array waveguide grating (AWG), for example, for multiplexing the optical signals $S_1$ to $S_N$. The optical signals $S_1$ to $S_N$ multiplexed are transmitted as a multiplexed optical signal $S_{MUX}$ (see graph G9).

When generated by Nyquist WDM, the multiplexed optical signal $S_{MUX}$ has the spectrum illustrated in graph G9. As the center frequencies $\omega_1$ to $\omega_N$ of the spectra of the optical signals $S_1$ to $S_N$ are controlled with precision in the way described above, crosstalk between neighboring channels is deterred and high spectral efficiency multiplexing is achieved. The optical multiplexing scheme used in the transmission apparatus is not limited to Nyquist WDM but other schemes such as OFDM may be used.

Figure 9:
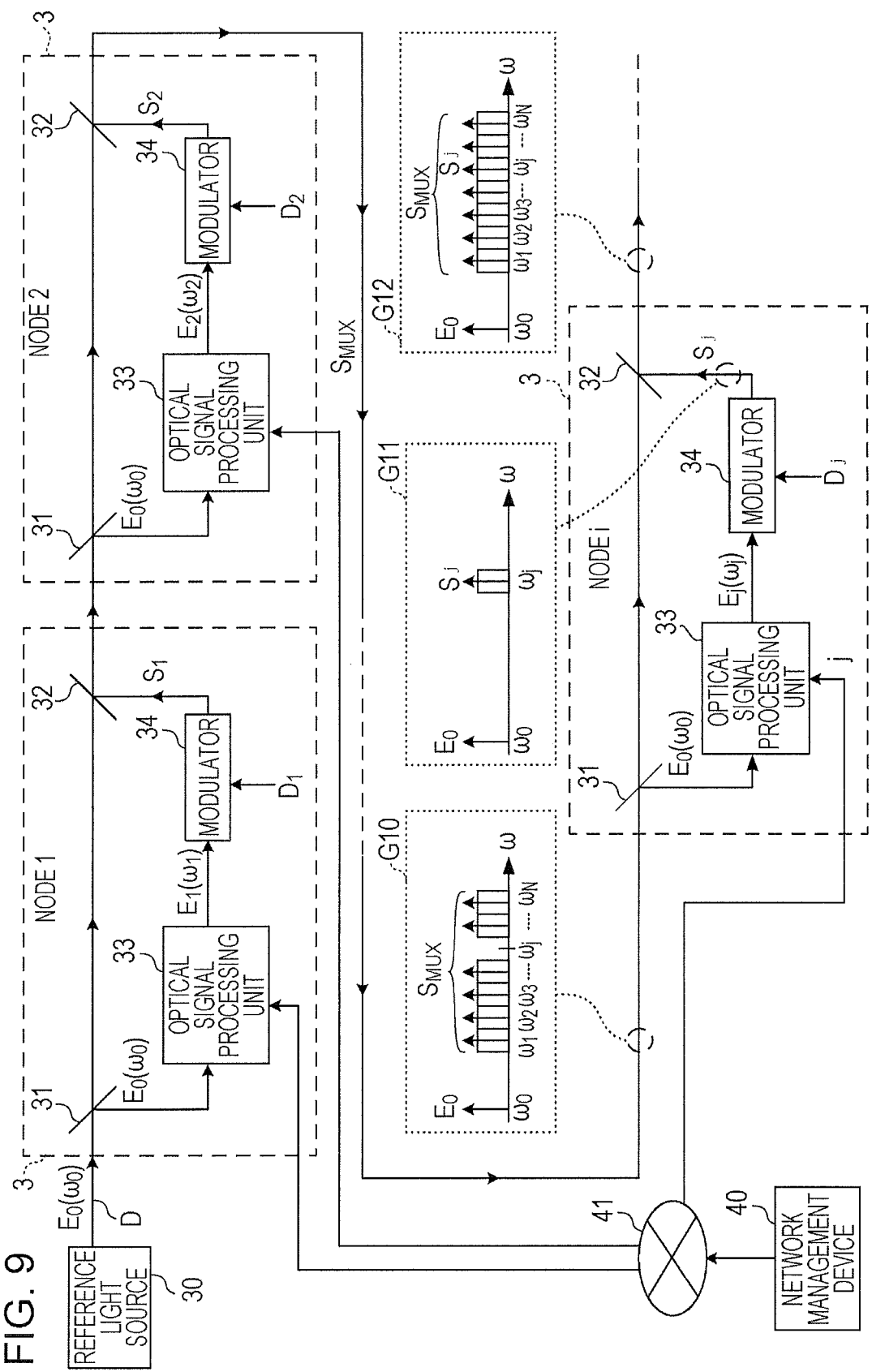
FIG. 9 is a diagram illustrating the configuration of the transmission apparatus according to another embodiment.

Although the transmission apparatus illustrated in FIG. 8 has a configuration in which optical signals $S_1$ to $S_N$ on channels 1 to N are multiplexed at one node in an optical network, this is not limitative; it may have a configuration in which an optical signal for each channel is generated at each individual node and such optical signals are multiplexed. FIG. 9 is a diagram illustrating the configuration of the transmission apparatus for this case.

The transmission apparatus has a reference light source 30 and multiple node devices 3 respectively provided at multiple nodes. The reference light source 30 and the node devices 3 are connected to a common transmission line D.

The reference light source 30 is the counterpart of the reference light source 11 of the aforementioned optical signal processing apparatus, and outputs reference light $E_0$ to the transmission line D. The node devices 3 generate optical signals $S_1$ to $S_N$ using the reference light $E_0$ and outputs them to the transmission line D. Thus, on the transmission line D, reference light $E_0$ and a multiplexed optical signal $S_{MUX}$ resulting from multiplexing of multiple optical signals $S_1$ to $S_N$ are transmitted (see graph G12).

Each node device 3 includes a demultiplexer 31, a multiplexer 32, an optical signal processing unit 33, and a modulator 34. At each node device 3, the reference light $E_0$ is separated by the demultiplexer 31 and input to the optical signal processing unit 33. The demultiplexer 31 may be a WDM coupler, for example, and extracts reference light $E_0$ from light propagating on the transmission line D.

Each optical signal processing unit 33 has the configuration of the aforementioned optical signal processing apparatus excluding the reference light source 11. That is, the reference light source 30 and the optical signal processing unit 33 correspond to the optical signal processing apparatus described above. The optical signal processing units 33 respectively generate optical carriers $E_1$ to $E_N$ from reference light $E_0$ in the manner described earlier. The optical signal processing units 33 of the node devices 3 thus have different frequencies $\omega_1$ to $\omega_N$ of the modulated component extracted by the second filter 142.

The modulators 34 modulate the optical carriers $E_1$ to $E_N$ with data signals $D_1$ to $D_N$ to generate multiple optical signals $S_1$ to $S_N$. The modulation scheme may be QAM, for example. The generated optical signals $S_1$ to $S_N$ are output to the transmission line D via the multiplexing unit 32. The multiplexing unit 32 may be an optical coupler, for example.

The node device 3 at each node generates one of optical carriers $E_1$ to $E_N$ of a frequency corresponding to a channel number assigned to the node device 3. For example, when channel number j is assigned to the node device 3 at node j, the optical signal processing unit 33 generates optical carrier $E_j$ of frequency $\omega_j$.

Assignment of channel number j is done by a network management device 40, which is responsible for managing devices in the optical network. The network management device 40 is connected with the node devices 3 over a local area network (LAN) 41, for example.

When channel number j (frequency $\omega_j$) is unused (see graph G10), the network management device 40 informs the optical signal processing unit 33 of that channel number j. The optical signal processing unit 33 sets the frequency to be extracted through second filter 142, namely the integer N mentioned above, based on the channel number j assigned. In other words, the optical signal processing unit 33 generates an optical carrier of the frequency used on an unused channel (j) among channels 1 to N respectively corresponding to optical signals.

The modulator 34 modulates the optical carrier $E_j$ generated by the optical signal processing unit 33 with data signal $D_j$ to generate optical signal $S_j$ having a spectrum with center frequency $\omega_j$ (see graph G11). The generated optical signal $S_j$ is output to the transmission line D via the multiplexing unit 32 and superimposed on multiplexed optical signal $S_{MUX}$ immediately before entering node j (see graph G12).

The transmission apparatus according to this embodiment enables flexible usage of frequency resources since an unused channel number j is assigned to each node device 3 and optical signal $S_j$ having frequency $\omega_j$ corresponding to that channel number j is generated.

Figure 10:
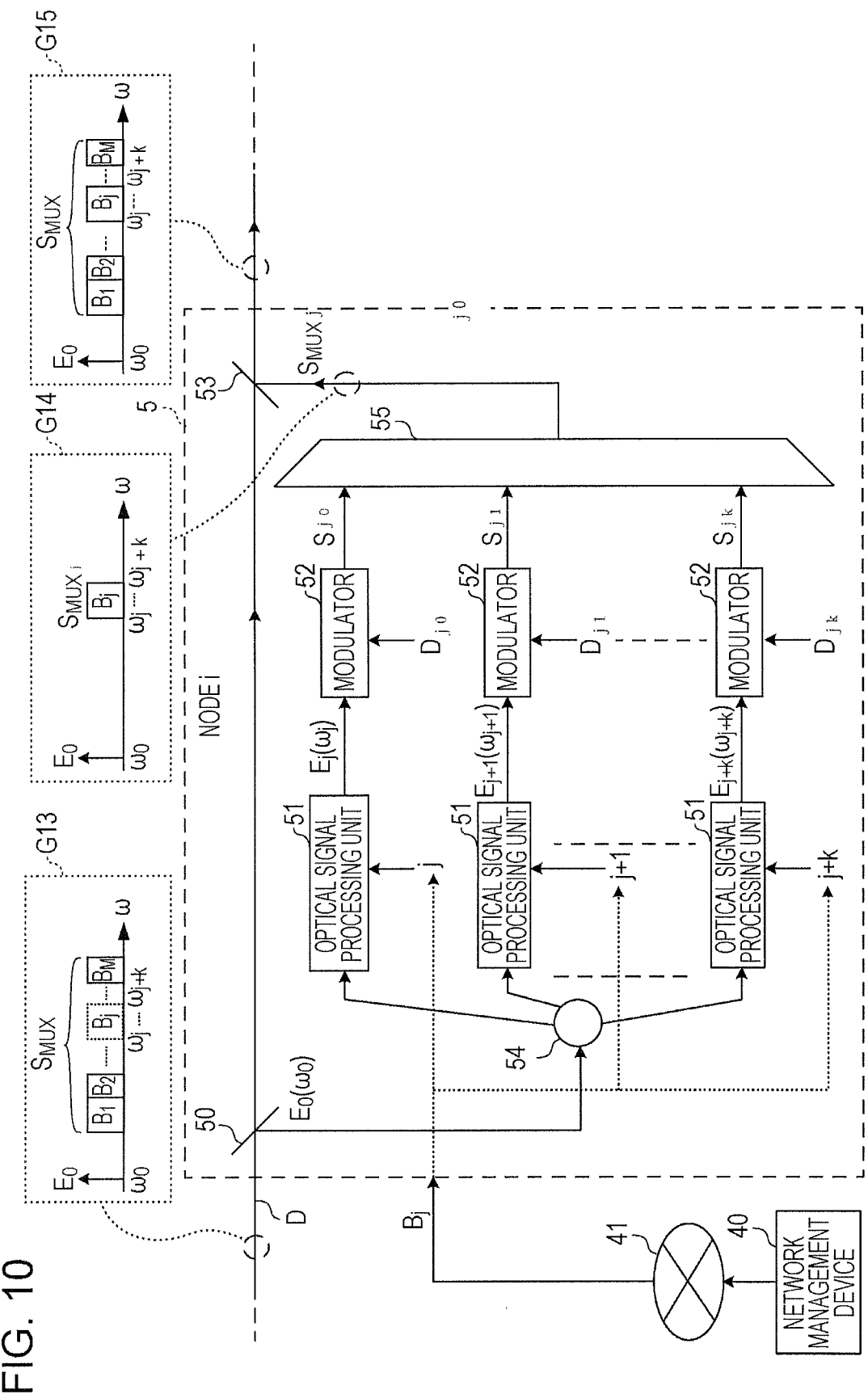
FIG. 10 is a diagram illustrating the configuration of the transmission apparatus according to still another embodiment.

For allowing more flexible usage, per-band assignment may be adopted instead of per-frequency assignment. FIG. 10 is a diagram illustrating the configuration of the transmission apparatus for such a case. FIG. 10 illustrates the configuration of node device 5 at node j in the node configuration of FIG. 9.

As illustrated in graph G13, reference light $E_0$ and multiplexed optical signal $S_{MUX}$ propagate on the transmission line D as in the embodiment in FIG. 9. The multiplexed optical signal $S_{MUX}$ is generated by multiplexing one or more optical signals belonging to multiple bands $B_1$ to $B_M$. The bandwidths of the bands $B_1$ to $B_M$ may be the same or different; band $B_1$ may be 30 Gbps and band $B_2$ may be 20 Gbps, for example.

The bands $B_1$ to $B_M$ are managed by a network management device 41 and assigned to the node devices 5. For example, when band $B_j$ is unused as illustrated in graph G13, the network management device 41 assigns the band $B_j$ to the node device 5.

The bands $B_1$ to $B_M$ each include a band component formed of one or more optical carriers in accordance with their bandwidth. For instance, band $B_j$ includes a band component formed of optical carriers having frequencies $\omega_j$ to $\omega_{j+k}$. The total number of optical carriers corresponding to the bands $B_1$ to $B_M$ is equal to the maximum number of optical carriers N.

The node device 5 generates sub-carrier multiplexed optical signal $S_{MUXj}$ responsive to band $B_j$ assigned to the node device 5. The node device 5 includes a demultiplexer 50, multiplexers 53, 55, a splitter 54, multiple optical signal processing units 51, and multiple modulators 52.

The reference light $E_0$ propagating on the transmission line D is separated by the demultiplexer 50 and input to the optical signal processing units 51 via the splitter 54. The optical signal processing units 51 respectively receive input of frequency numbers j to j+k (equivalent to the aforementioned channel numbers) corresponding to the assigned band $B_j$ from the network management device 41. The demultiplexer 50 and splitter 54 may be optical splitters, for example.

The optical signal processing units 51 respectively generate optical carriers $E_j$ to $E_{j+k}$ with center frequencies $\omega_j$ to $\omega_{j+k}$ in accordance with frequency numbers j to j+k in the manner described earlier. The optical signal processing units 51 respectively generate optical carriers $E_j$ to $E_{j+k}$ of frequencies $\omega_j$ to $\omega_{j+k}$ that are used in an unused band $B_j$ among bands $B_1$ to $B_M$ of multiplexed optical signal $S_{MUX}$ produced by further multiplexing multiple optical signals (sub-carrier multiplexed optical signals $S_{MUXj}$) that have been multiplexed at each node. The generated optical carriers $E_j$ to $E_{j+k}$ are respectively input to the modulators 52.

The modulators 52 modulate the optical carriers $E_j$ to $E_{j+k}$ with data signals $D_{j0}$ to $D_{jk}$ to generate multiple optical signals $S_{j0}$ to $S_{jk}$. The modulation scheme may be QAM, for example. The generated optical signals $S_{j0}$ to $S_{jk}$ are multiplexed at the multiplexing unit 55 into sub-multiplexed optical signal $S_{MUXj}$ of band $B_j$ (see graph G14). The sub-multiplexed optical signal $S_{MUXj}$ is multiplexed with multiplexed optical signal $S_{MUX}$ via the multiplexing unit 53 and output to the transmission line D (see graph G15). The multiplexing unit 53 may be an optical coupler and the multiplexing unit 55 may be an array waveguide grating (AWG) filter or a frequency selective switch (WSS), for example.

The transmission apparatus according to this embodiment enables flexible band usage responsive to the amount of traffic at each node by assigning separate bands $B_1$ to $B_M$ to the individual node devices 5.

Figure 11:
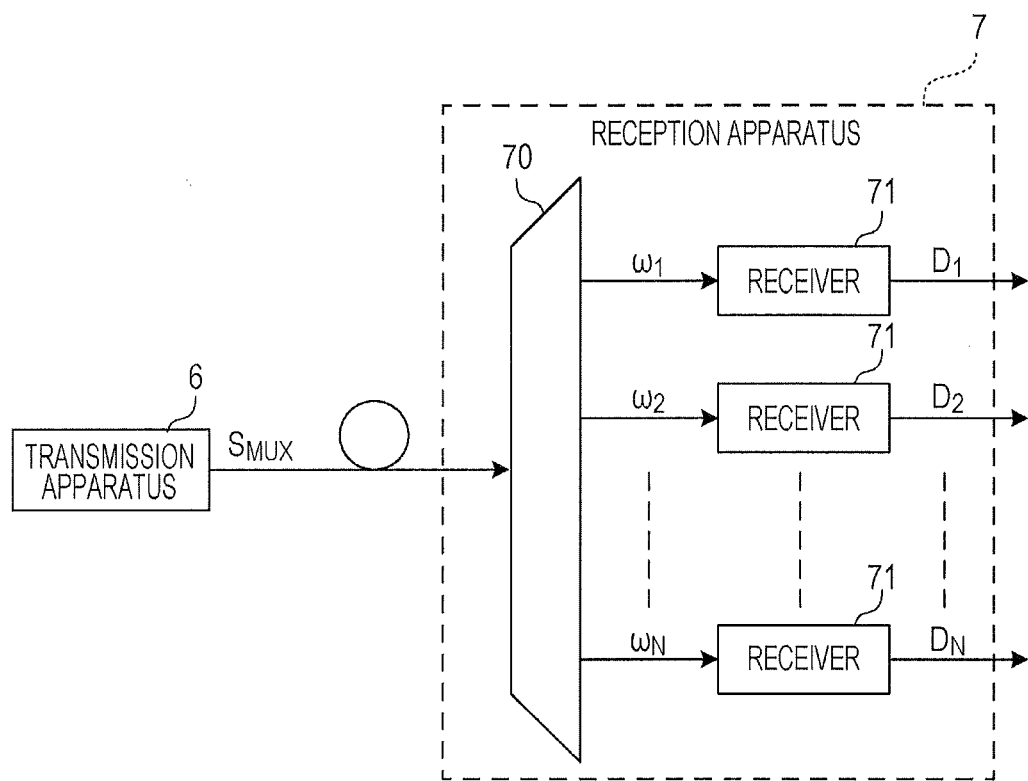
FIG. 11 is a diagram illustrating an example of the configuration of a communications system.

Next, a reception apparatus for receiving the multiplexed optical signal $S_{MUX}$ sent by the transmission apparatus above will be described. FIG. 11 is a diagram illustrating an example of the configuration of a communications system.

The communications system includes a transmission apparatus 6 and a reception apparatus 7, which are interconnected by a transmission line. The transmission apparatus 6 represents the above-described transmission apparatus and transmits multiplexed optical signal $S_{MUX}$ to the reception apparatus 7 over the transmission line.

The reception apparatus 7, including a demultiplexer 70 and multiple receivers 71, receives the multiplexed optical signal $S_{MUX}$ transmitted by the transmission apparatus 6. Although this example illustrates that the number of receivers 71 is the same as the number of channels N for multiplexed optical signal $S_{MUX}$, there may be fewer receivers 71 than the number of channels for cost cutting. In that case, optical signals on multiple channels may be extracted through optical filters within the receivers 71, or alternatively, optical signals may be converted to electrical signals through photoelectric conversion, after which signals from the individual channels may be extracted through an electrical filter as discussed later. This may be the case when an OFDM signal generated by multiplexing signals for multiple channels is transmitted, for example.

The reception apparatus 7 includes a demultiplexer 70 and multiple receivers 71. The demultiplexer 70 is an AWG for example, and demultiplexes the multiplexed optical signal $S_{MUX}$ input from the transmission line back into optical signals $S_1, S_2, \ldots, S_N$ of frequencies $\omega_1, \omega_2, \ldots, \omega_N$ and distributes them to the receivers 71. The receivers 71 respectively receive the optical signals $S_1, S_2, \ldots, S_N$ and reconstruct data signals $D_1, D_2, \ldots, D_N$ from the optical signals $S_1, S_2, \ldots, S_N$ and output them.

Figure 12:
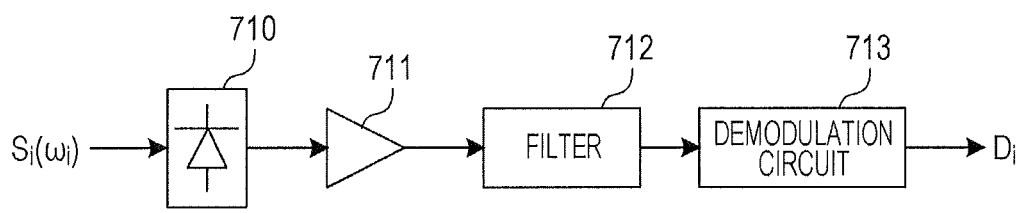
FIG. 12 is a diagram illustrating an example of the configuration of a receiver.

FIG. 12 is a diagram illustrating an example of the configuration of the receivers 71. The receiver 71 includes a light receiver 710, an amplifier 711, a filter 712, and a demodulation circuit 713.

The light receiver 710 is a PD, for example, and converts optical signal $S_i$ into an electrical signal. The amplifier 711 amplifies the electrical signal input from the light receiver 710. The filter 712 extracts a predetermined frequency component from the electrical signal. If the number of receivers 71 is less than the number of channels N, the filter 712 may extract frequency components for multiple channels instead of a frequency component for a single channel.

Figure 13:
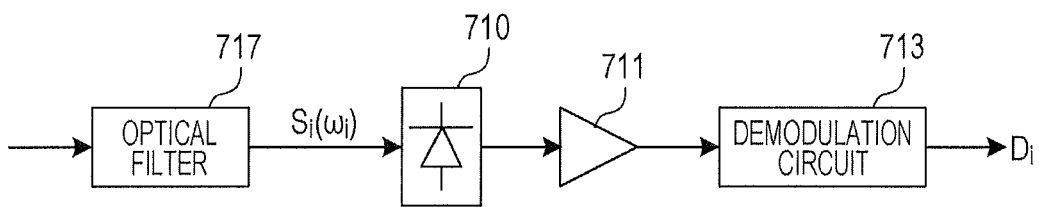
FIG. 13 is a diagram illustrating another example of the configuration of a receiver.

Also, when the number of receivers 71 is less than the number of channels N, the operating bandwidth of the light receiver 710 may possibly be narrower than the bandwidth of an optical multiplexed signal it receives. In this case, an optical filter 717 for extracting a desired frequency component $S_i(\omega_i)$ from an optical multiplexed signal may be provided at the input end of the light receiver 710 instead of the filter 712 as illustrated in FIG. 13.

Referring back to FIG. 12, the demodulation circuit 713 demodulates a predetermined frequency component of the electrical signal extracted by the filter 712 to reconstruct data signal $D_j$. For demodulation, envelope detection, square-low detection, or synchronous detection, for example, may be used as appropriate for the modulation scheme used with data signal $D_i$. In a case where data signal $D_i$ is modulated by OFDM, QAM, or other kinds of multilevel modulation scheme, the demodulation circuit 713 performs demodulation by digital signal processing. The receiver 71 may further include a processing circuit for forward error correction and/or a processing circuit for fluctuation detection and correction on demodulated data signal $D_j$.

Figure 14:
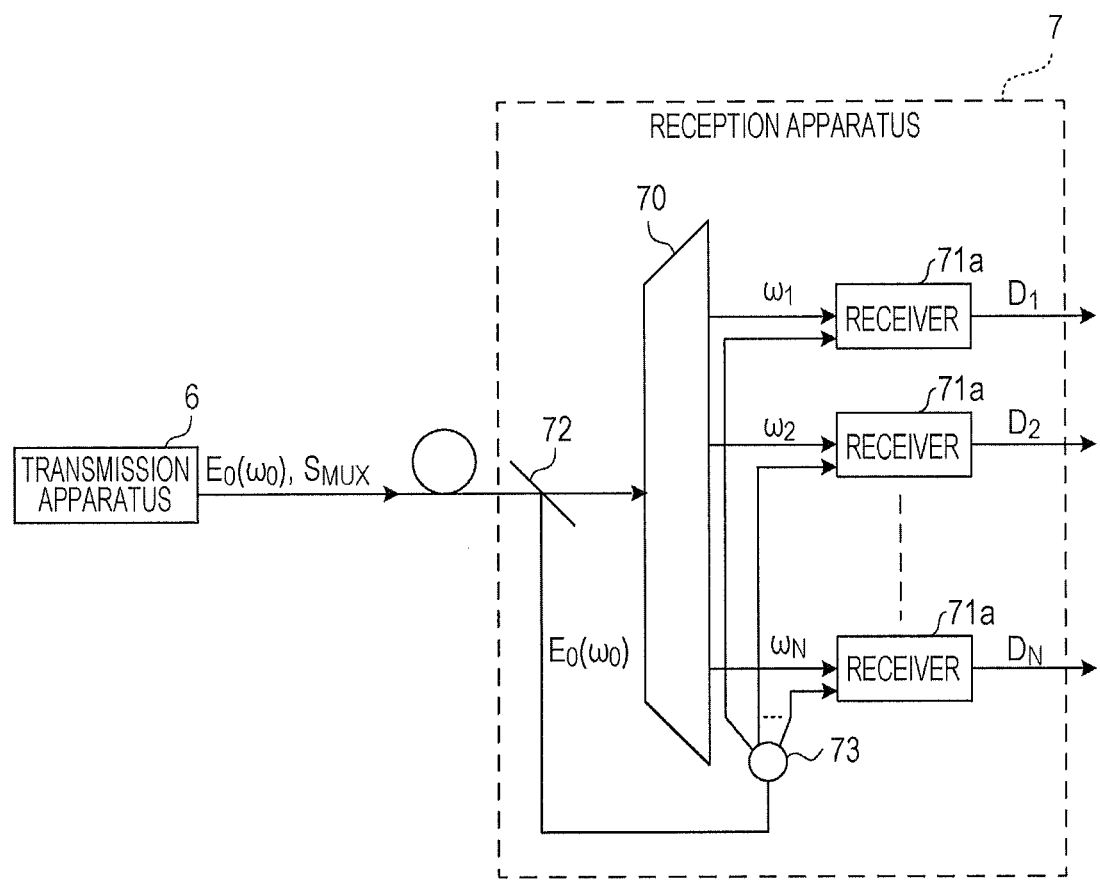
FIG. 14 is a diagram illustrating another example of the configuration of a communications system.

When digital coherent optical communication is employed in the communications system, the reception apparatus 7 conducts a reception process using a local light (referenced light). FIG. 14 is a diagram illustrating the configuration of a transmission system for this case. In FIG. 14, elements common to FIG. 11 are denoted with the same reference characters and their descriptions are omitted.

Reference light $E_0$ output from the reference light source in the transmission apparatus 6 is input to the reception apparatus 7 over the transmission line together with multiplexed optical signal $S_{MUX}$. The reception apparatus 7 includes demultiplexers 70, 72, 73, and multiple receivers 71a. The reference light $E_0$ may be input to the reception apparatus 7 over a different path from that of the multiplexed optical signal $S_{MUX}$. In the case of the transmission apparatus illustrated in FIG. 8, the reference light $E_0$ is input to the transmission line from the reference light source 20 by way of the optical signal processing unit 22, the modulator 23, and the multiplexer 24.

The reference light $E_0$ is taken from the transmission line by the demultiplexer 72 and distributed to the multiple receivers 71a via the demultiplexer 73. The demultiplexers 72, 73 may be optical splitters, for instance. The number of receivers 71a may be either the same or less than the number of channels N.

Figure 15:
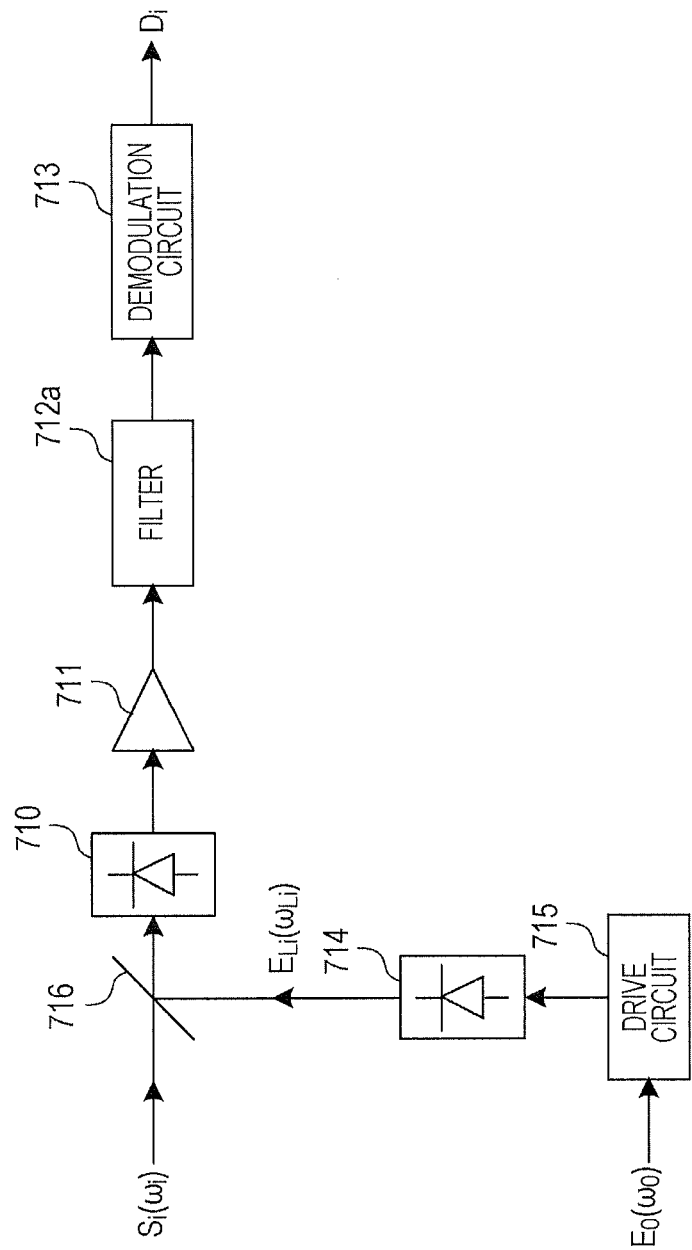
FIG. 15 is a diagram illustrating an example of the configuration of a receiver.
Figure 16:
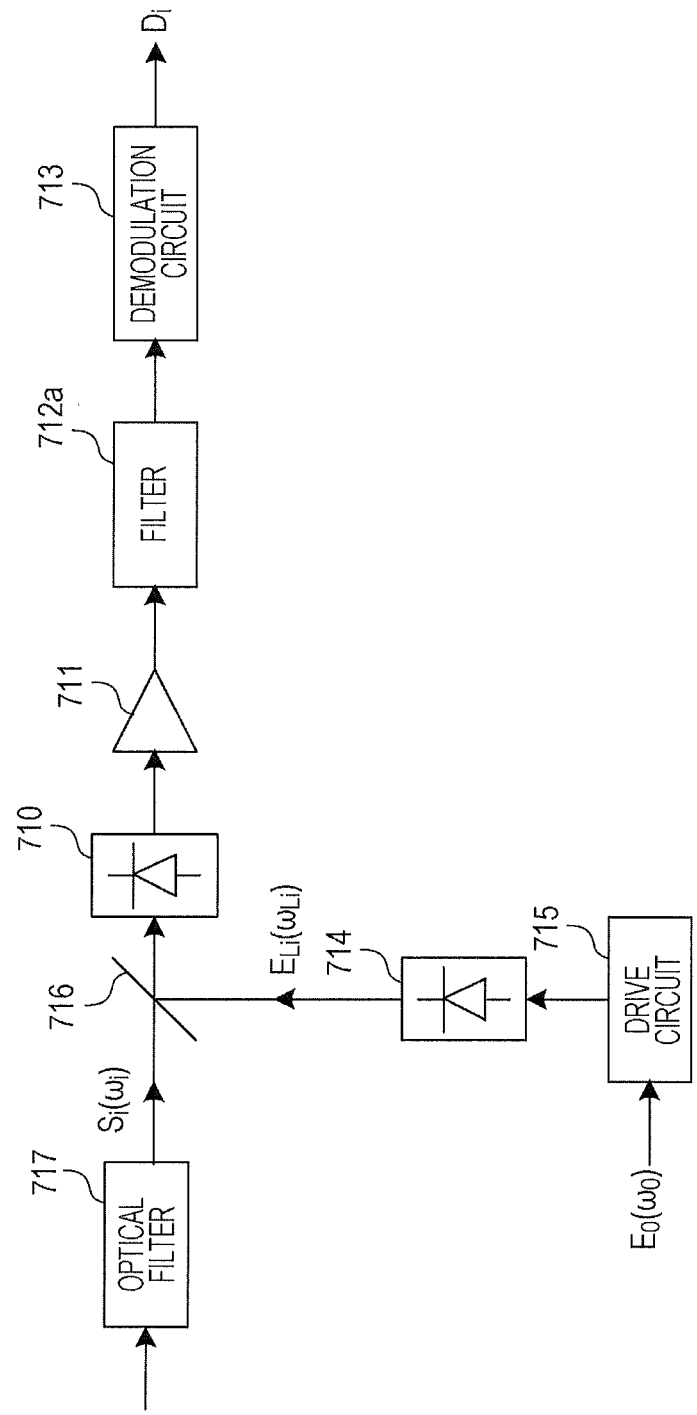
FIG. 16 is a diagram illustrating another example of the configuration of a receiver.

FIG. 15 is a diagram illustrating an example of the configuration of the receivers 71a. In FIG. 15, elements common to FIG. 12 are denoted with the same reference characters and their descriptions are omitted.

The receiver 71a includes a multiplexer 716, a light receiver 710, an amplifier 711, a filter 712a, a demodulation circuit 713, a referenced light source 714, and a drive circuit 715. The drive circuit 715 controls the referenced light source 714 based on the reference light $E_0$ input from the demultiplexer 73. This causes the referenced light source 714 to output referenced light $E_{Li}$ of a predetermined frequency $\omega_{Li}$.

The referenced light $E_{Lj}$ is multiplexed with optical signal $S_j$ at the multiplexer 716 and input to the light receiver 710. The light receiver 710 outputs an electrical signal (a beat signal) having an intermediate frequency band between the frequency $\omega_j$ of the optical signal $S_j$ and the frequency $\omega_{Lj}$ of referenced light $E_{Lj}$. The filter 712a passes the electrical signal of the intermediate frequency band. Here, if the frequency $\omega_j$ of the optical signal $S_j$ is the same as the frequency $\omega_{Lj}$ of referenced light $E_{Lj}$, homodyne detection may be performed.

Also in this example, if the operating bandwidth of the light receiver 710 is narrower than the bandwidth of an optical multiplexed signal it receives, an optical filter 717 for extracting a desired frequency component $S_j(\omega_j)$ from the optical multiplexed signal may be provided at the input end of the light receiver 710 as illustrated in FIG. 13.

As has been described, the optical signal processing apparatus according to embodiments includes the optical frequency comb generation unit 12, the filter 13, and the optical carrier generation unit 14. The optical frequency comb generation unit 12 generates optical frequency comb $E_{CM}$. The filter 13 extracts multiple optical components $E_{CT}$ having a certain frequency interval $n\omega_r$ between them from the optical frequency comb $E_{CM}$. The optical carrier generation unit 14 generates optical carrier $E_N(\omega_N)$ having center frequency $\omega_N$ that is away from the center frequency $\omega_0$ of reference light $E_0$ by an integer (N) multiple of frequency interval $n\omega_r$ by multiplexing the optical components $E_{CT}$ with reference light $E_0$ ($\omega_0$).

The frequency interval $n\omega_r$ of the multiple optical components $E_{CT}$ extracted from the optical frequency comb $E_{CM}$ may be a precise value owing to stabilization of the frequency interval $\omega_r$ of optical frequency comb $E_{CM}$. Additionally, multiplexing of reference light $E_0$ ($\omega_0$) with the multiple optical components $E_{CT}$ produces multiple modulated components $E_{-L}, \ldots, E_L$ having the frequency interval $n\omega_r$ between them.

The modulated components $E_{-L}, \ldots, E_L$ have center frequency $\omega_N$ that is away from the center frequency $\omega_0$ of reference light $E_0$ by an integer (N) multiple of the frequency interval $n\omega_r$. Because the frequency interval $n\omega_r$ is a highly precise value, the center frequency $\omega_N$ of modulated components $E_{-L}, \ldots, E_L$ ($=\omega_0 + N \cdot n\omega_r$) also is made a highly precise value by stabilizing the center frequency $\omega_0$ of reference light $E_0$ as the frequency standard. Therefore, by generating optical carrier $E_N$ from the modulated components $E_{-L}, \ldots, E_L$, an optical carrier with reduced fluctuations in its center frequency may be obtained.

An optical signal processing method according to an embodiment includes a step of generating optical frequency comb $E_{CM}$ and extracting multiple optical components $E_{CT}$ having a precise frequency interval $n\omega_r$ between them from the optical frequency comb $E_{CM}$. The optical signal processing method according to the embodiment further generates an optical carrier having center frequency $\omega_N$ that is away from the center frequency $\omega_0$ of reference light $E_0$ by an integer (N) multiple of frequency interval $n\omega_r$ by multiplexing the multiple optical components $E_{CT}$ with reference light $E_0$.

Since the optical signal processing method according to an embodiment has a similar configuration to that of the optical signal processing apparatus discussed above, it provides similar effects.

While the present disclosure has been specifically described with reference to preferred embodiments thereof, those skilled in the art will appreciate that variations may be made based on the basic technical idea and teachings of the present disclosure.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical signal processing apparatus, comprising:
    an optical frequency comb generation unit configured to generate an optical frequency comb;
    an extraction unit configured to extract a plurality of optical components having a certain frequency interval between the optical components from the optical frequency comb;
    an optical carrier generation unit configured to multiplex the plurality of optical components with reference light to thereby generate an optical carrier having a center frequency away from the center frequency of the reference light by an integer multiple of the frequency interval; and
    a carrier-increasing frequency comb generation unit configured to generate a frequency comb based on the optical carrier generated by the optical carrier generation unit, wherein
    the optical carrier generation unit includes a non-linear optical medium,
    the optical carrier generation unit generates a plurality of modulated components by multiplexing the plurality of optical components and the reference light and the generated modulated components are input into the non-linear optical medium, and
    the optical carrier generation unit extracts a predetermined modulated component from the plurality of modulated components to thereby generate the optical carrier.

2. The optical signal processing apparatus according to claim 1, wherein the non-linear optical medium is an optical fiber.

3. The optical signal processing apparatus according to claim 1, further comprising:
    a state detection unit configured to detect at least one state of the plurality of modulated components generated by the optical carrier generation unit; and
    a state control unit configured to control the state of the plurality of optical components to be input to the optical carrier generation unit based on the at least one state of the plurality of modulated components detected by the state detection unit.

4. The optical signal processing apparatus according to claim 1, wherein the optical frequency comb generation unit generates the optical frequency comb by modulating light based on a drive signal that oscillates at a predetermined reference frequency.

5. The optical signal processing apparatus according to claim1, wherein the extraction unit is an optical frequency filter.

6. A transmission apparatus, comprising:
    an optical signal processing apparatus includes:
        an optical frequency comb generation unit configured to generate an optical frequency comb,
        an extraction unit configured to extract a plurality of optical components having a certain frequency interval between the optical components from the optical frequency comb,
        an optical carrier generation unit configured to multiplex the plurality of optical components with reference light to thereby generate an optical carrier having a center frequency away from the center frequency of the reference light by an integer multiple of the frequency interval, and
        a carrier-increasing frequency comb generation unit configured to generate a frequency comb based on the optical carrier generated by the optical carrier generation unit;
    a plurality of modulators configured to respectively modulate a plurality of optical carriers respectively generated by the plurality of optical signal processing apparatuses with a plurality of data signals to generate a plurality of optical signals; and
    a multiplexer configured to multiplex the plurality of optical signals, wherein
    the optical carrier generation unit includes a non-linear optical medium,
    the optical carrier generation unit generates a plurality of modulated components by multiplexing the plurality of optical components and the reference light and the generated modulated components are input into the non-linear optical medium, and
    the optical carrier generation unit extracts a predetermined modulated component from the plurality of modulated components to thereby generate the optical carrier.

7. The transmission apparatus according to claim 6, wherein the plurality of optical signal processing apparatuses each generate an optical carrier of a frequency that is used on an unused channel among a plurality of channels respectively corresponding to the plurality of optical signals.

8. The optical signal processing apparatus according to claim 6, further comprising:
    a state detection unit configured to detect at least one state of the plurality of modulated components generated by the optical carrier generation unit; and
    a state control unit configured to control the state of the plurality of optical components to be input to the optical carrier generation unit based on the at least one state of the plurality of modulated components detected by the state detection unit.

9. The optical signal processing apparatus according to claim 6, wherein the optical frequency comb generation unit generates the optical frequency comb by modulating light based on a drive signal that oscillates at a predetermined reference frequency.

10. An optical signal processing method, comprising:
    generating an optical frequency comb;
    extracting a plurality of optical components having a certain frequency interval between the optical components from the optical frequency comb;
    multiplexing the plurality of optical components with reference light to thereby generate an optical carrier having a center frequency away from the center frequency of the reference light by an integer multiple of the frequency interval;
    generating a carrier-increasing frequency comb based on the generated optical carrier;

generating a plurality of modulated components by multiplexing the plurality of optical components and the reference light and inputting the generated modulated components into a non-linear optical medium; and extracting a predetermined modulated component from the plurality of modulated components to thereby generate the optical carrier.

11. The optical signal processing method according to claim 10, wherein the optical frequency comb is generated by modulating light based on a drive signal that oscillates at a predetermined reference frequency.

12. The optical signal processing apparatus according to claim 1, wherein the extraction unit comprises an optical frequency filter configured to extract the plurality of optical components having a certain frequency interval $n\omega_r$ (n=1, 2, 3, . . . ) from the optical frequency comb, thereby producing a beat light having a difference frequency n times the frequency interval $\omega_r$ of the optical frequency comb.

13. The optical signal processing apparatus according to claim 12, wherein the optical frequency filter is a tunable frequency filter.

14. An optical signal processing apparatus, comprising:

an optical frequency comb generation unit configured to generate an optical frequency comb;

an extraction unit configured to extract a plurality of optical components having a certain frequency interval between the optical components from the optical frequency comb;

an optical carrier generation unit configured to generate, by non-linear optical effect in a non-linear optical medium, an optical carrier by multplexing the plurality of optical components and the reference light, the optical carrier having a center frequency away from the center frequency of the reference light by an integer multiple of the frequency interval; and a carrier-increasing frequency comb generation unit configured to generate a frequency comb based on the optical carrier generated by the optical carrier generation unit.

* * * * *